US011314779B1

(12) United States Patent
Jain

(10) Patent No.: US 11,314,779 B1
(45) Date of Patent: Apr. 26, 2022

(54) MANAGING TIMESTAMPS IN A SEQUENTIAL UPDATE STREAM RECORDING CHANGES TO A DATABASE PARTITION

(71) Applicant: Amazon Technologies, Inc., Seattle, WA (US)

(72) Inventor: Vaibhav Jain, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 404 days.

(21) Appl. No.: 15/994,897

(22) Filed: May 31, 2018

(51) Int. Cl.
| G06F 16/00 | (2019.01) |
| G06F 16/27 | (2019.01) |
| G06F 1/12 | (2006.01) |
| G06F 16/21 | (2019.01) |
| G06F 16/22 | (2019.01) |

(52) U.S. Cl.
CPC .............. *G06F 16/278* (2019.01); *G06F 1/12* (2013.01); *G06F 16/214* (2019.01); *G06F 16/2246* (2019.01)

(58) Field of Classification Search
CPC ............ G06F 16/2455; G06F 16/2471; G06F 16/24568; G06F 16/278; G06F 16/214; G06F 16/2246; G06F 1/12
USPC ....................................................... 707/610
See application file for complete search history.

(56) References Cited

U.S. PATENT DOCUMENTS

| 8,566,476 | B2 | 10/2013 | Shiffer et al. | |
| 9,411,862 | B1* | 8/2016 | Wang | G06F 16/2471 |
| 9,659,042 | B2 | 5/2017 | Puri et al. | |
| 9,697,238 | B2 | 7/2017 | Ahmed et al. | |
| 2005/0076390 | A1* | 4/2005 | Klausberger | H04N 21/23109 725/134 |
| 2013/0173819 | A1* | 7/2013 | Lee | H04N 21/2662 709/231 |
| 2015/0120749 | A1* | 4/2015 | Phanishayee | G11B 27/034 707/741 |
| 2015/0127284 | A1* | 5/2015 | Seshan | G01D 21/00 702/89 |
| 2016/0085772 | A1* | 3/2016 | Vermeulen | G06F 16/21 707/615 |
| 2016/0359711 | A1 | 12/2016 | Deen et al. | |
| 2017/0017676 | A1* | 1/2017 | Levy | G06F 16/24568 |

(Continued)

*Primary Examiner* — Chelcie L Daye
(74) *Attorney, Agent, or Firm* — Robert C. Kowert; Kowert, Hood, Munyon, Rankin & Goetzel, P.C.

(57) ABSTRACT

Systems and methods for managing timestamps for a sequential update stream in a distributed system. A system includes a plurality of storage nodes of a data stream service of a provider network. Each storage node includes one or more processors and memory storing instructions executable by the one or more processors. The instructions cause the one or more processors to create a shard, at the storage node, for storing records of a sequential update stream recording changes to a database partition. The instructions also cause the one or more processors to assign a timestamp for the shard based on a local clock of the storage node. The instructions further cause the one or more processors to adjust the timestamp for the shard to a time later than a timestamp for a previous shard of the sequential update stream stored at a different storage node of the plurality of storage nodes.

20 Claims, 9 Drawing Sheets

(56) References Cited

U.S. PATENT DOCUMENTS

2017/0075932 A1 3/2017 Wang et al.
2017/0242882 A1* 8/2017 Watkins .................. G06F 16/23

* cited by examiner

US 11,314,779 B1

MANAGING TIMESTAMPS IN A SEQUENTIAL UPDATE STREAM RECORDING CHANGES TO A DATABASE PARTITION

BACKGROUND

Services in a service-oriented provider network can utilize distributed computing nodes to perform various functions required for the services. Database systems may support data streaming to process updates to items or data stored in a database. The updates may be stored as data records that may be maintained as part of a data stream. The data records may be grouped as shards in the data stream. Over time, partitions of the database may be split or subsequently partitioned into child partitions. The child partitions may have respective shards for corresponding data records indicating modification of data to the child partitions. Lineage of the data stream may be maintained by utilizing timestamps for each of the shards for each of the partitions of the database. The timestamps may be set by local clocks at the storage nodes that host each of the partitions. Because the local clocks may be physical clocks at the storage nodes, minor imperfections in timekeeping can cause inaccurate timestamp tracking when multiple storage nodes are used. Inaccurate timestamps may cause incorrect ordering of shards of the data stream. Incorrect ordering may result in the lineage of the data stream being incomplete or cause data in the data stream to be improperly applied in sequential order.

Figure 1:
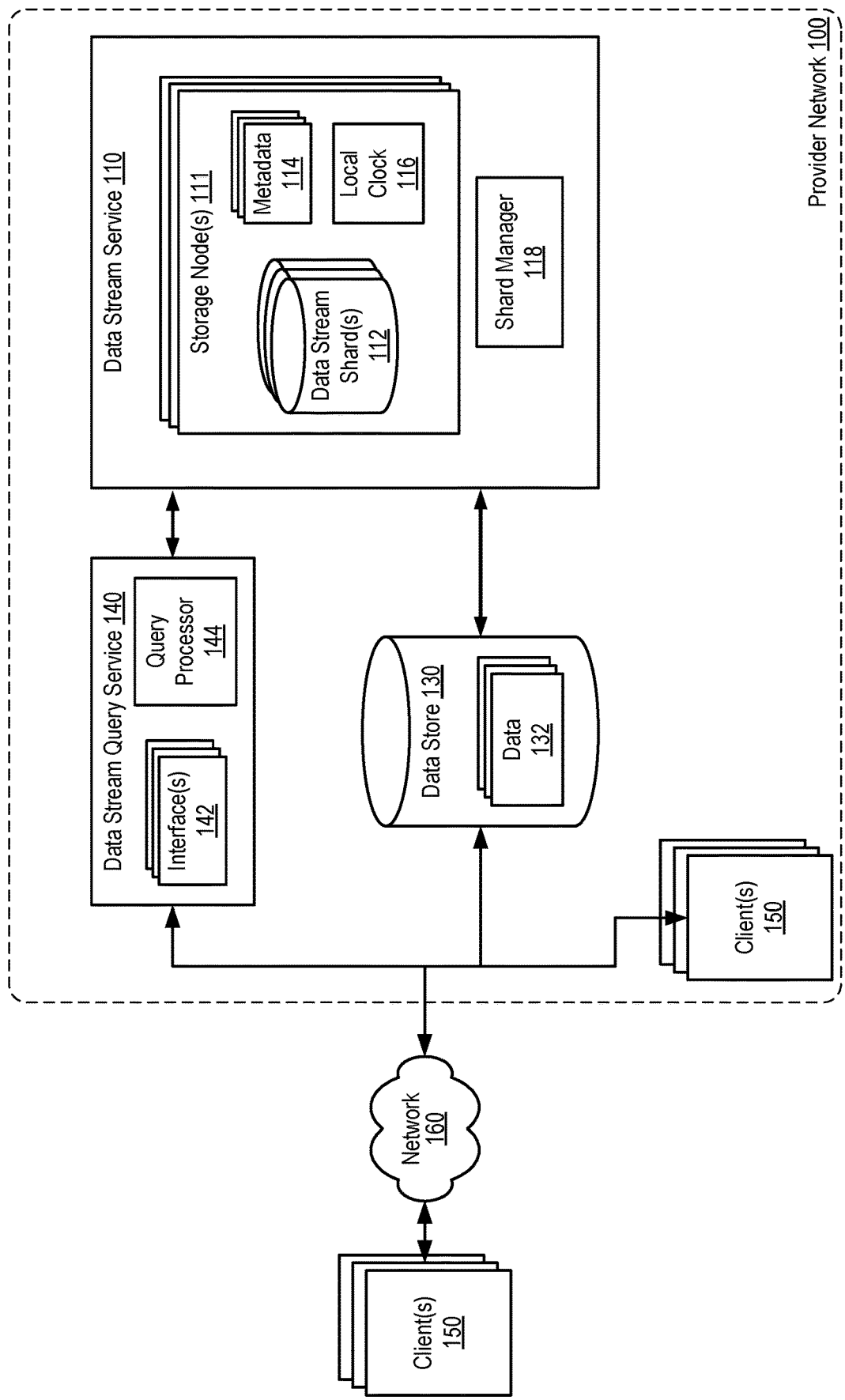
FIG. 1 is a logical block diagram illustrating a provider network that implements a distributed system that incorporates a sequential update stream for a database, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. As used throughout this application, the phrase "based on" a factor means based at least in part on the factor, rather than exclusively based on the factor, such that an event "based on" the factor can also be influenced or modified by another factor. The terms "sequential update stream," "data stream" or "stream," as used herein, refer to a sequence of data records that may be generated by one or more data producers and accessed by one or more data consumers, where each data record is assumed to be an immutable sequence of bytes. The terms "data shard" or "shard," as used herein, refer to a grouping of data records included in a data stream.

DETAILED DESCRIPTION

Various embodiments of systems and processes that manage timestamps for a sequential update stream in a distributed system are disclosed herein. In some aspects of the invention, a system is disclosed herein. The system includes a plurality of storage nodes of a data stream service of a provider network. Each storage node includes one or more processors and a memory. The memory may store instructions that, when executed by the one or more processors, cause the one or more processors to perform one or more operations. The operations may include performing at least creating a shard, at a storage node of the plurality of storage nodes, for storing records of a sequential update stream recording changes to a database partition. The operations may include performing at least assigning a timestamp for the shard based on a local clock of the storage node. The operations may include performing at least adjusting the timestamp for the shard to a time later than a timestamp for a previous shard of the sequential update stream stored at a different storage node of the plurality of storage nodes.

In another aspect of the invention, a method is disclosed herein. The method may include creating a shard, at a storage node, for storing records of a sequential update stream recording changes to a database partition. The method may also include assigning a timestamp for the shard based on a local clock of the storage node. The method may also further include adjusting the timestamp for the shard to a time later than a timestamp for a previous shard of the sequential update stream stored at a different storage node.

In yet another aspect of the invention, a non-transitory, computer-readable storage medium is disclosed herein. The computer-readable storage medium may store instructions that, when executed by one or more processors, cause the one or more processors to perform one or more operations. The instructions may cause the one or more processors to create a shard, at a storage node, for storing records of a sequential update stream recording changes to a database partition. The instructions may also cause the one or more processors to assign a timestamp for the shard based on a local clock of the storage node. The instructions may further cause the one or more processors to adjust the timestamp for the shard to a time later than a timestamp for a previous shard of the sequential update stream stored at a different storage node.

A method for setting timestamps in a sequential update stream recording changes to a database partition is disclosed herein, according to some embodiments. The method includes creating a shard, at a storage node, for a sequential update stream (or a data stream) recording changes to a database partition. The method also includes assigning a timestamp for the shard based on a local clock of the storage node. The method may further include determining a previous timestamp of a previous shard for the sequential update stream. The method also includes determining whether the timestamp for the shard is earlier than the timestamp for the previous shard. Based on a determination that the timestamp for the shard is earlier than the previous timestamp for the previous shard, the method further includes adjusting the timestamp based at least in part on adding an offset value to the previous timestamp. Based on a determination that the timestamp for the shard is later than the previous timestamp for the previous shard, the method further includes determining whether a difference between the timestamp for the shard and the timestamp of the previous shard exceeds a threshold. Based on a determination that the difference between the timestamp for the shard and the timestamp of the previous shard exceeds the threshold, the method further includes adjusting the timestamp based on subtracting a reduction offset value from the timestamp. The method further includes by saving the timestamp to metadata for the shard. The method also includes determining whether a clock skew of the storage node exceeds a clock skew threshold. The method may conclude by resynchronizing the local clock of the storage node.

A method for creating and migrating shards for a sequential update stream recording changes to a database partition is disclosed herein, according to some embodiments. The method includes creating, at a storage node, a shard for a sequential update stream recording changes to a database partition. The method includes determining whether a rotation trigger event has occurred. The method also includes migrating the shard to a different storage node as a new shard. The method also includes sending, to the different storage node, information indicating the timestamp of the shard. The method also includes assigning a timestamp for the new shard based on a local clock of the different storage node. The method also includes adjusting the timestamp for the new shard based on a difference between the timestamp of the shard and the timestamp of the new shard.

A method for creating shards for a sequential update stream recording changes to a database partition responsive to splitting a partition of the database is disclosed herein, according to some embodiments. The method includes creating, at a storage node, a shard for a sequential update stream recording changes to a database partition. The method includes determining whether the database partition has been split. The method includes creating a plurality of child shards for the sequential update stream at a plurality of storage nodes, each child shard corresponding to each child partition of the database partition. The method also includes sending, to the plurality of storage nodes, information indi- cating the timestamp of the shard. The method also includes assigning respective timestamps for the child shards based on respective local clocks of the plurality of storage nodes. The method also includes adjusting the timestamps for the child shards based on respective differences between the timestamp of the shard and the timestamps of the child shards.

FIG. 1 is a logical block diagram illustrating a provider network that implements a sequential update stream service, which may also be referred to as a data stream service, according to some embodiments. Provider network 100 may be a private or closed system, in one embodiment, or may be set up by an entity such as a company or a public sector organization to provide one or more services (such as various types of cloud-based storage) accessible via the Internet and/or other networks to clients 150, in another embodiment. In one embodiment, provider network 100 may be implemented in a single location or may include numerous data centers hosting various resource pools, such as collections of physical and/or virtualized computer servers, storage devices, networking equipment and the like (e.g., computing system 1000 described below with regard to FIG. 10), needed to implement and distribute the infrastructure and storage services offered by the provider network 100. In one embodiment, provider network 100 may implement various computing resources or services, such as a database service, a data stream service 110 or other data processing (e.g., relational or non-relational (NoSQL) database query engines, map reduce processing, data warehouse, data flow processing, and/or other large scale data processing techniques), data storage services (e.g., an object storage service, block-based storage service, or data storage service that may store different types of data for centralized access), virtual compute services, and/or any other type of network based services (which may include various other types of storage, processing, analysis, communication, event handling, visualization, and security services not illustrated).

Clients 150 may include data producers that provide data to a database at data store 130, according to some embodiments. For example, clients 150 may read, write or modify data 132 for the database at data store 130. In some embodiments, data store 130 may generate data records indicating changes to storage objects, tables or other data structures stored in data 132. For example, the data records may indicate the changes to data 132 on an individual basis. The data records may be sent or provided to data stream service 110 for access by clients 150 to further examine individual changes to data 132 at a later time from data stream service 110. For example, data stream service 110 may provide short-term record keeping for the data records within a retention time period to provide access to data records for clients 150.

Data stream service 110 may include one or more storage nodes 111, according to some embodiments. The one or more storage nodes 111 may be comprised of different hardware components and located in different physical locations to provide a geographically distributed network for a data stream. In some embodiments, each of storage nodes 111 may include storage components configured to store one or more data stream shards 112. In some embodiments, shards 112 may be configured to store one or more data records that correspond to operations performed at a database. For example, data records of shards 112 may indicate manipulated data for a database stored at data store 130.

Storage nodes 111 may also store metadata 114 for corresponding shards 112, according to some embodiments. For example, metadata 114 may store information indicating timestamps and sequence numbers (also referred to as sequence indicators) for data records that make up a shard or the shard as a whole. In some embodiments, shards 112 may be associated with respective timestamps indicating at least a creation point-in-time, a completion point-in-time, or both. For example, a given shard 112 may be assigned a creation timestamp that indicates when the given shard 112 was created at storage node 111. As another example, a given shard 112 may be assigned a completion timestamp that indicates when the given shard 112 was completed, such as when a time interval has elapsed or when the given shard 112 has a file size that meets or exceeds a maximum file size threshold. In some embodiments, storage nodes 111 may assign timestamps to shards 112 based on local clock 116 (also referred to as clock 116) at each node of storage nodes 111. For example, clock 116 may continuously track time to associate operations performed at storage nodes 111 with a point-in-time. In some embodiments, clock 116 may report time as an integer value with a reference point (e.g., epoch time). In other embodiments, clock 116 may report time in a generally accepted time notation, such as date:hour:minute:second form. In some embodiments, each of storage nodes 111 may include local clock 116 as a separate physical hardware component. In other embodiments, each of storage nodes 111 may include clock 116 as a virtual clock that may be implemented as part of one or more other hardware components. Using local clocks 116 to establish timestamps may improve efficiency and reduce overhead in assigning timestamps by removing the need to keep the lineage of shards 112 in order without referring to a global or centralized clock every time a shard 112 is created at storage nodes 111.

Shard manager 118 may be configured to manage shards 112 at storage nodes 111, according to some embodiments. For example, shard manager 118 may determine when to create shards 112 at one or more different storage nodes of storage nodes 111. In some situations, shards 112 may be rotated among a plurality of storage nodes 111. For example, shards 112 may be rotated on a periodic basis, e.g., after a four hour time period. Rotating the shards 112 across storage nodes 111 may balance heat generation across storage nodes 111 to mitigate overheating issues that can arise if an individual storage node performs all of the data operations for the data stream service 110. In other situations, shard manager 118 may direct creation of new shards 112 responsive to an indication that one or more partitions of the database have been split. For example, splitting the partitions may cause new lineages for data streams such that new shards 112 may be created to continue tracking the new lineages.

Each of storage nodes 111 may have respective clocks 116 to provide timestamps for shards 112 stored at each of storage nodes 111, according to some embodiments. In some situations, each clock 116 may report different timestamps for a given point in time. A difference between two or more clocks 116 may be referred to as clock skew. Clock skew may be caused by several factors. For example, clock skew may be caused by manufacturing defects or differences between each clock 116. In another example, clock skew may be caused by temporary power disruptions that cause clock 116 to temporarily lose the ability to track time.

Clock skew can create one or more problems when ordering data stream shards 112 based on timestamps, such as for querying the shards 112. For example, clock skew may cause a given shard to incorrectly appear that it is prior in time to a parent shard of the given shard. As another example, clock skew may cause two shards to appear as if they are contemporaneously or simultaneously created. Lineage of shards 112 may be maintained by ensuring that timestamps for shards 112 are stored or tagged in an increasing order, in some embodiments. For example, shards 112 may be determined to be in correct order when corresponding timestamps of sequential shards 112 are at least 1 time unit greater than respective preceding or parent shards 112. Maintaining the lineage of shards 112 serves to improve data stream service technology by reducing a quantity of failed data stream queries due to mismanaged timestamps that may disrupt an intended order of shards 112.

In some embodiments, the provider network 100 may include a data stream archiver 120 configured to handle or manage archived shards of data streams that are stored with or maintained by the data stream service 110. For example, data stream archiver 120 may receive an indication that a time interval for a given shard 112 has elapsed such that the given shard 112 will no longer receive additional data records. After the time interval, the given shard 112 may be archived to be accessible for reading but not writing. In some embodiments, the given shard 112 may be accessible for reading during a retention period. For example, the given shard 112 may be accessible for a twenty-four hour retention period to allow clients 150 access to the given shard 112 during the retention period. After the retention period, storage nodes 111 or data store 130 may purge or delete the given shard 112 to free up storage space for additional shards 112.

The archived shards may be maintained by one or more data storage services. In some embodiments, the data storage services may include a data store 130. The data store 130 may be configured to store one or more databases. For example, data store 130 may be configured to store current, active or saved data for the one or more databases. In other embodiments, data store 130 may store archived shards, such as archived versions of shards 112 from storage nodes 111. In some embodiments, data store 130 may be implemented across storage nodes 111. In other embodiments, data store 130 may be implemented by other storage components of provider network 100.

In various embodiments, the components illustrated in FIG. 1 may be implemented directly within computer hardware, as instructions directly or indirectly executable by computer hardware (e.g., a microprocessor or computer system), or using a combination of these techniques. For example, the components of FIG. 1 may be implemented by a system that includes a number of computing nodes (or simply, nodes), in one embodiment, each of which may be similar to the computer system embodiment illustrated in FIG. 10 and described below. In one embodiment, the functionality of a given system or service component (e.g., a component of data stream service 110) may be implemented by a particular node or may be distributed across several nodes. In some embodiments, a given node may implement the functionality of more than one service system component (e.g., more than one data store component, such as storage nodes 111 or data store 130).

Data stream service 110 may include various types of data stream services for database services, in one embodiment, (both relational and non-relational) for storing, querying, and updating data. Such database services may be enterprise-class database systems that are highly scalable and extensible. In one embodiment, queries may be directed to a data stream in data stream service 110 that is distributed across multiple physical resources (e.g., computing nodes or database nodes), and the database system may be scaled up or down on an as needed basis. The database system may work effectively with database schemas of various types and/or organizations, in different embodiments. In one embodiment, clients/subscribers may submit queries in a number of ways, e.g., interactively via a SQL interface to the database system. In other embodiments, external applications and programs may submit queries using Open Database Connectivity (ODBC) and/or Java Database Connectivity (JDBC) driver interfaces to the database system. In one embodiment, data stream service 110 may also be any of various types of data processing services to perform different functions (e.g., query or other processing engines to perform functions such as anomaly detection, machine learning, data lookup, or any other type of data processing operation). For example, in at least one embodiment, data stream service 110 may include a map reduce service that creates clusters of database nodes that implement map reduce functionality over data stored in one of data storage services (e.g., data store 130). Various other distributed processing architectures and techniques may be implemented by data stream service 110 (e.g., grid computing, sharding, distributed hashing, etc.) in another embodiment.

In one embodiment, clients 150 may encompass any type of client configurable to submit network-based requests to provider network 100 via network 160, including requests for data stream service 110 (e.g., to query a data stream managed by the data stream service 110) or data storage service(s) (e.g., a request to create, read, write, obtain, or modify data in data storage service(s), etc.). For example, in one embodiment a given client 150 may include a suitable version of a web browser, or may include a plug-in module or other type of code module configured to execute as an extension to or within an execution environment provided by a web browser. Alternatively, in a different embodiment, a client 150 may encompass an application such as a data stream application (or user interface thereof), a media application, an office application or any other application that may make use of storage resources in data storage service(s) to store and/or access the data to implement various applications. In one embodiment, such an application may include sufficient protocol support (e.g., for a suitable version of Hypertext Transfer Protocol (HTTP)) for generating and processing network-based services requests without necessarily implementing full browser support for all types of network-based data. That is, client 150 may be an application configured to interact directly with provider network 100, in one embodiment. In one embodiment, client 150 may be configured to generate network-based services requests according to a Representational State Transfer (REST)-style network-based services architecture, a document- or message-based network-based services architecture, or another suitable network-based services architecture.

In one embodiment, a client 150 may be configured to provide access to provider network 100 to other applications in a manner that is transparent to those applications. For example, client 150 may be configured to integrate with a data stream on data stream service 110. In such an embodiment, applications may not need to be modified to make use of the storage system service model. Instead, the details of interfacing to the data stream service 110 may be coordinated by client 150.

The clients 150 may communicate with the data stream service 110 from within the provider network 100, in some embodiments. For example, the clients 150 may be implemented on computing nodes of a computing service offered by the provider network 100. The clients 150 may convey network-based services requests to and receive responses from provider network 100 via network 160, in one embodiment. In one embodiment, network 160 may encompass any suitable combination of networking hardware and protocols necessary to establish network-based-based communications between clients 150 and provider network 100. For example, network 160 may encompass the various telecommunications networks and service providers that collectively implement the Internet. In one embodiment, network 160 may also include private networks such as local area networks (LANs) or wide area networks (WANs) as well as public or private wireless networks. For example, both a given client 150 and provider network 100 may be respectively provisioned within enterprises having their own internal networks. In such an embodiment, network 160 may include the hardware (e.g., modems, routers, switches, load balancers, proxy servers, etc.) and software (e.g., protocol stacks, accounting software, firewall/security software, etc.) necessary to establish a networking link between given client 150 and the Internet as well as between the Internet and provider network 100. It is noted that in one embodiment, clients 150 may communicate with provider network 100 using a private network rather than the public Internet.

The clients 150 may send a request to perform an operation to respective databases managed by the data stream service 110. For example, a given client 150 may send a PUT (or SET) command and corresponding data to request that the data be stored in the database at the data store 130. In another example, a given client 150 may send a CHANGE (or UPDATE) command and corresponding data to request that some data existing in the database at the data store 130 be changed based on the sent data. In yet another example, a given client 150 may send a DELETE (or REMOVE) command and identify data to request that the data existing in the database at the data store 130 be deleted or removed from the database and the data store 130. In other embodiments, a given client 150 may provide another command to perform some operation to the data stored in the database at the data store 130.

In some embodiments, responsive to the request to perform the operation, the data stream service 110 may direct an event to perform the operation causing one or more changes to data stored in a partition of the database. For example, the data stream service 110 may store new data in the partition of the database in response to the PUT command received from the given client 150. As another example, the data stream service 110 may indicate that an operation was performed to change some data stored in the partition of the database in response to the CHANGE command received from the given client 150. As yet another example, the data stream service 110 may delete some data from the partition of the database in response to the DELETE command received from the given client 150.

Data stream query service 140 may be accessed by clients 150 to retrieve one or more data records or shards 112 from data stream service 110, according to some embodiments. For example, data stream query service 150 may include on or more application programming interfaces (APIs) 142 that facilitate querying a data stream. In some embodiments, the APIs 142 may be configured to receive a request from clients 150 to query the data stream. For example, clients 150 may send requests to data stream query service 140 in accordance with APIs 142 to retrieve a list of shards 112 of a data stream that is managed by data stream service 110. In some embodiments, the request may indicate a specified time period or range of timestamps to limit the query. For example, the request may specify a range of timestamps for which data is requested. In some embodiments, the list of shards 112 may be generated by query processor 144 responsive to the request from clients 150. In some embodiments, the list of shards 112 may be arranged or ordered in chronological order based on timestamps for each of shards 112. For example, query processor 144 may retrieve respective timestamps for shards 112 from metadata 114. In some embodiments, query processor 144 may accept that the timestamps in metadata 114 are ordered in such a fashion that lineage of shards 112 is properly maintained. For example, query processor 144 may be configured to base ordering of shards 112 based on the timestamps in metadata 114 without subsequent adjustment or offsetting. Query processor 144 may not need to adjust the timestamps in metadata 114 because metadata tagger 118 previously adjusted the timestamps with respect to other shards 112 of the data stream when shards 112 were created for the data stream. In some embodiments, query processor 144 may request an iterator to iterate a shard 112 to retrieve data records. For example, the iterator may traverse shard 112 to identify each of the data records contained in the shard 112. The iterator may read from shard 112 in a linear fashion based on the sequence numbers of the data records.

Figure 2:
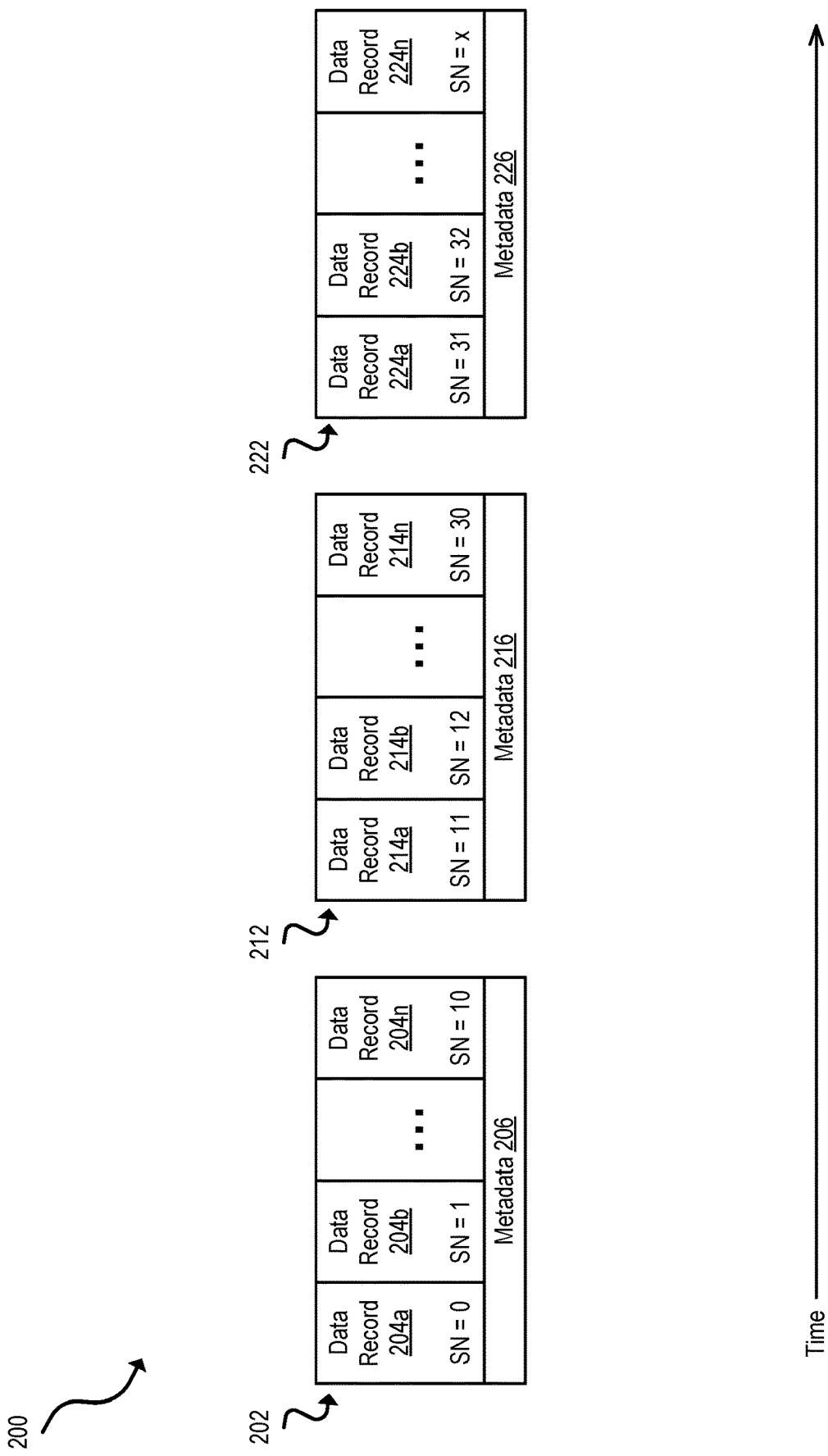
FIG. 2 is a timeline diagram illustrating shards of a sequential update stream over time, according to some embodiments.

FIG. 2 illustrates a data stream 200 for a database, according to some embodiments. The data stream 200 may be conceptualized over a timeline. As a visual example, the data stream 200 may include a plurality of shards, e.g., shard 202, shard 212 and shard 224. Each of the shards may include one or more data records that indicate one or more modifications to the database. For example, shard 202 may include data records 204a-n, shard 212 may include data records 214a-n, and shard 222 may include data records 224a-n. The quantity of data records in a given shard can be greater than or less than the illustrated example. In some embodiments, a size of a given shard may be constrained by one or more of a quantity of data records stored in the shard or by time. For example, a given shard may be limited to a fixed number of data records. As another example, a given shard may be limited in time increments to record data records. In some embodiments, a given shard may be discarded from the data stream 200 after a set period of time, such as a data retention period. For example, shard 202 may be deleted from the data stream 200 when the shard 202 is twenty-four (24) hours old.

The plurality of shards may be stored across one or more storage nodes, such as storage nodes 111 of FIG. 1, according to some embodiments. For example, shard 202 may be stored at a first storage node, shard 212 may be stored at a second storage node, and shard 222 may be stored at a third storage node. Storing shard 202, shard 212 and shard 222 on different storage nodes may reduce overhead costs associated with data storage, such as limiting heating caused by the storage nodes or reducing wear and tear on storage components of the storage nodes caused by repeated writes and reads of data.

A given data record may represent or correspond to a modification of data in the database, according to some embodiments. For example, data record 204a may correspond to storage of data in the database. As another example, data record 214a may correspond to modification or changing of the data in the database. In some embodiments, the data records may be assigned a sequence number to indicate an order in which the data record was published or added to the stream. In other embodiments, the data records may be assigned a timestamp to indicate an order in which the data record was published or added to the stream.

A given shard may include metadata to store information regarding the data records in the given shard, according to some embodiments. For example, shard 202 may include metadata 206, shard 212 may include metadata 216, and shard 222 may include metadata 226. In some embodiments, the metadata may include sequence numbers for the operations described by the data records. For example, metadata 206 may include sequence numbers for the operations that are recorded in data records 204a-n, indicated as SN in FIG. 2. Metadata 216 may include sequence numbers for the operations that are recorded in data records 214a-n. Metadata 226 may include sequence numbers for the operations that are recorded in data records 224a-n. In some embodiments, the metadata may include timestamps for the operations described by the data records. For example, metadata 206 may include timestamps for the operations that are recorded in data records 204a-n. Metadata 216 may include timestamps for the operations that are recorded in data records 214a—. Metadata 226 may include timestamps for the operations that are recorded in data records 224a-n. In other embodiments, the metadata for the data records may be stored with corresponding data records. For example, metadata for data record 204a may be stored in shard 202 as part of data record 204a in one or more metadata storage containers.

FIG. 300 illustrates an abstracted timeline view of a plurality of storage nodes, including node 310, node 320 and node 330. In some embodiments, node 310, node 320 and node 330 may each include a clock that is configured to provide a continuously running time that may be associated with certain operations. For example, the clock may provide timestamps for particular data records that indicate particular operations that are performed as part of the data stream. For the purposes of illustrating time as indicated by the clock, timeline 311, timeline 321 and timeline 331 illustrate time as indicated by the respective clocks of node 310, node 320 and node 330. Timeline 311, timeline 321 and timeline 331 are not intended to be drawn to scale, and the sizing or spacing of timeline 311, timeline 321 and timeline 331 is not intended to be limiting.

Timeline 311 includes timestamps 312a . . . n to illustrate various points-in-time at which operations occur at node 310. Timeline 321 includes timestamps 322a . . . n to illustrate various points-in-time at which operations occur at node 320. Timeline 331 includes timestamps 322a . . . n to illustrate various points-in-time at which operations occur at node 330. In some embodiments, the points-in-time may correspond to a creation time for a shard, a completion time for the shard, or both. In other embodiments, the points-in-time may correspond to one or more data records that are included in the shard. For example, each of the one or more data records may have associated timestamps that are recorded based on a current time of the clock when the data records are created and/or processed in the data stream.

Node 310, node 320 and node 330 may be comprised of different computing hardware or different resources of the provider network, in some embodiments. For example, node 310 may be operable in a different physical portion of the provider network from node 320 and/or node 330. As another example, node 310, node 320 and node 330 may be different computer units in a multi-tenant, multi-computer server environment. In some embodiments, node 310, node 320 and node 330 have different clocks to track time for operations that occur at the respective nodes. For example, node 310 may include a clock that is local to node 310, node 320 may include a clock that is local to node 320, and node 330 may include a clock that is local to node 330, where node 310, node 320 and node 330 are distinct hardware computers.

The respective clocks may be configured to track absolute time such that the clocks are intended to be tracking the same points-in-time, according to some embodiments. For example, the clocks of node 310, node 320 and node 330 may be configured to be indicative of the same time as the clocks are incremented. However, due to desynchronization or other various causes that may delay or disrupt the time tracked by the clocks, node 310, node 320 and node 330 may not be tracking the same points-in-time and have synchronized time on the respective clocks. For example, when the clock of node 310 reports that the current time is 100, the clock of node 320 may incorrectly report that the current time is 90, and the clock of node 330 may incorrectly report that the current time is 110, despite being the same point-in-time in terms of absolute or physical time. The discrepancy between the clocks may be referred to as clock skew 340.

In some situations, clock skew 340 may be a constant value with respect to node 310 and node 320. For example, the clocks of node 310 and node 320 may maintain constant movement of time, but the actual number associated with the time may be different. As another example, the clock of node 310 may report 100 when the clock of node 320 may report 90, and the clock of node 310 may report 200 when the clock of node 320 may report 190. In other situations, clock skew 342 may increase over time due to gradual differences in measurements of time increments with respect to node 320 and node 330. For example, the clocks of node 320 and node 330 may have differences in calculating time that compound and create larger or smaller gaps in measured time. As another example, the clock of node 320 may report 100 when the clock of node 330 may report 105 at a given point in time, and the clock of node 320 may report 200 when the clock of node 330 may report 210 at a given point in time. In this example, the difference between the respective clocks increased by 5 over 100 time units. The increase of the difference may be referred to as clock skew drift.

The clock skew 340 may be alleviated after a determination that the clock skew 340 satisfies a clock skew threshold, according to some embodiments. For example, 320 may provide a notification to the data stream service indicating that the clock skew 340 exceeds a maximum allowable clock skew threshold. In some situations, the clock skew 340 may indicate that the clock of node 320 is reporting that timestamps are much lower (or earlier) relative to the clock of node 310. In other situations, the clock skew 342 may indicate that the clock of node 330 is reporting that timestamps are much higher (or later) relative to the clock of node 320. In some embodiments, based on a determination that clock skew 340 or clock skew 342 satisfies the clock skew threshold, the clocks of node 310, node 320 and node 330 may be resynchronized to a reference clock. For example, the clocks of node 310, node 320 and node 330 may be resynchronized to a clock that is designated as a primary clock for the data stream service. In other embodiments, the clocks of node 320 and/or node 330 may be synchronized to the clock of node 310.

As an illustrative, non-limiting example of clock skew 340 being a problem that exists in the art for sequentially updating data streams, suppose a data stream includes, in sequence, shard 314, shard 324 and shard 334. Suppose shard 314 is created at node 310 at time 312a. For the purposes of an example, assume that time 312a and time 322a correspond to the same point in actual time. However, due to clock skew 340, a timestamp that would be associated with time 322a is incorrectly indicated as a lower or earlier timestamp value than a timestamp associated with time 312a. In some embodiments, data records may be written to shard 314 for a time interval before a new shard is created at a different storage node. For example, data records may be written to shard 314 for a time interval between time 312a and time 312b. At time 312b, a new shard 324 may be created at node 320. In some embodiments, creating new shards at different storage nodes, which may be referred to as rotating shards, may alleviate overhead in operating sequential update stream services. For example, distributing creation and writing of shards may reduce heat generation that would accrue over periods of time if only one server node was managing the data records. As another example, a data stream manager may indicate that Shard 324 may be created at a point-in-time substantially contemporaneously with closing or archiving of shard 314, according to some embodiments. For example, shard 324 may be created at a point-in-time that is adequately close in order to prevent any data records from being unrecorded in between shard 314 and shard 324 being written or modified. Timestamp 312b may correspond to a point-in-time at which shard 314 may be rotated or closed or archived, etc. Timestamp 322b may correspond to a point-in-time at which shard 324 is created at node 320. For the purposes of illustrating the example, timestamp 312b and timestamp 322b may represent the same point-in-time with respect to absolute or physical time. However, due to clock skew 340, timestamp 322b may be lower or earlier than the timestamp 312b. In the illustrated example, timestamp 322b is earlier than timestamp 312a such that shard 324 would be incorrectly timestamped with a value that appears to be earlier than the timestamp for shard 314.

Clock skew 340 creates a problem in the timeline of the data stream such that when the data stream is queried for a timestamp, the returned shards may be incomplete, out of sequence or otherwise inaccurate. For example, a client may query the data stream with an indication of a given timestamp for the query, but clock skew 340 may introduce an unintended ordering of shards of the data stream. In some situations, querying for a shard at a given timestamp may cause the query to otherwise ignore any parent shards due to a potential lack of information about past shards of the lineage during a query operation. For example, a query operation may attempt to list a plurality of shards in chronological order starting with a given shard at a specified timestamp through subsequent shards. If clock skew 340 causes the lineage of the given shard to be out-of-order, unexpected consequences may occur. For example, clock skew 340 may cause shard 314 to no longer appear as a previous shard with respect to shard 324. As another example, clock skew 340 may cause shard 314 to appear as a subsequent shard with respect to shard 324. As yet another example, clock skew 340 may cause shard 314 to disappear from the lineage of shard 324 due to an unintended placement in the timeline.

Shard 324 may be created or generated at node 320 based on a determination that an interval of time has elapsed (e.g., between time 312a and time 312b), in some embodiments. For example, each of the plurality of shards may be created on a periodic basis to provide a rotational system of sequential updates that may be distributed across many storage nodes of a distributed system. To ensure that the timestamp for shard 324 maintains a lineage for the plurality of shards of the data stream, the timestamp for shard 324 may be adjusted, according to some embodiments. The timestamp 322b for shard 324 may be adjusted to be placed at a time at least one time unit after timestamp 312b. For example, node 320 may retrieve or receive metadata for shard 314 from the data stream service or from node 310. The metadata for shard 314 may indicate an ending timestamp for shard 314, such as timestamp 312b. In some embodiments, node 320 may be configured to determine whether timestamp 322b is earlier or less than timestamp 312b. For example, node 320 may determine based at least in part on a comparison that timestamp 322b is numerically less than timestamp 312b. In other embodiments, the sequential update stream service may be configured to determine that timestamp 322b is earlier or less than timestamp 312b. Based on a determination that timestamp 322b is earlier than timestamp 312b, node 320 may adjust timestamp 322b for shard 324. For example, node 320 may add an offset value to timestamp 312b to cause timestamp 322b to be greater than timestamp 312b. As an illustrative example, suppose timestamp 312b is 100 and timestamp 322b is 90. In some embodiments, node 320 may add a fixed offset value, such as an integer value of 1, to timestamp 312b to determine a timestamp value of 101. The timestamp value of 101 may be stored as the timestamp for shard 324 in metadata for shard 324. In another example, node 320 may add an offset value to timestamp 322b. In some embodiments, node 320 may add an offset value, such as an integer value of 11, to timestamp 322b to determine a timestamp value of 101. The timestamp value of 101 may be stored as the timestamp for shard 324 in metadata for shard 324. The recited offset values herein are not intended to be limiting, such that other offset values may be appropriate for different clock skews 340 or 342.

Clock skew 342 illustrates an example when the clock of node 330 is greater than or later than the clock of node 320. In the illustrated example, timestamp 322c and timestamp 332c correspond to the same point-in-time with respect to absolute or physical time. However, due to clock skew 342, timestamp 332c is greater than timestamp 322c. In some embodiments, node 330 may not need to adjust timestamp 332c based on a determination that timestamp 332c is greater than timestamp 322c. Adjustment may not be necessary because when ordering the plurality of shards based on timestamp ordering, shard 334 will be placed after shard 324 without any adjustments, despite clock skew 342. In some embodiments, clock skew 342 may become sufficiently large such that clock skew 342 propagates to other nodes causing increasing offset values to maintain timestamp-based ordering of the plurality of shards. The sequential update stream service may initiate synchronization to node 310, node 320 and node 330 to mitigate future clock skews similar to clock skews 340 and 342.

Figures 4A, 4B:
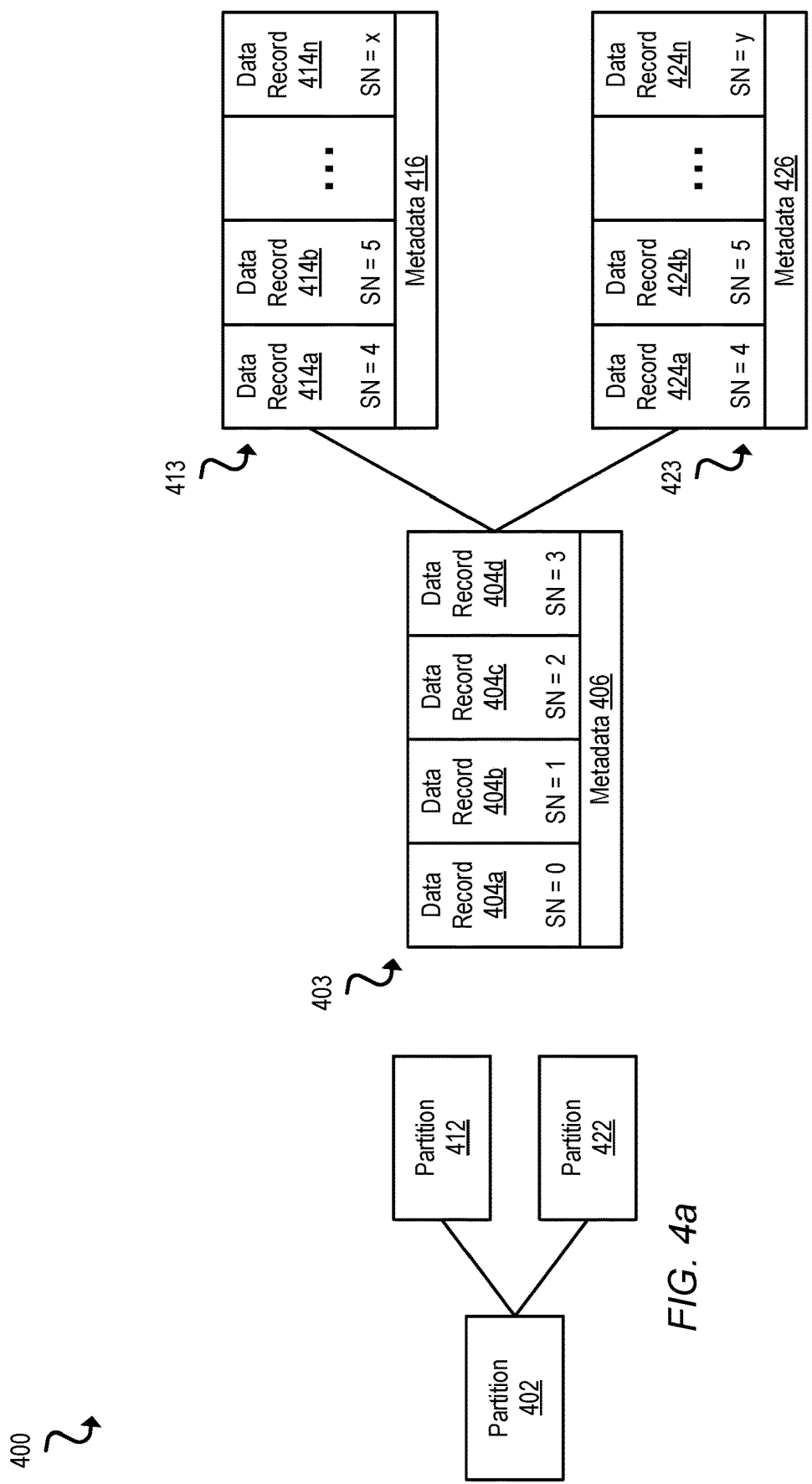
FIG. 4a is a representation of a lineage tree for a plurality of partitions for a database, according to some embodiments.
FIG. 4b is a representation of shards in a sequential update stream for the lineage tree for the plurality of partitions, according to some embodiments.

FIG. 4a illustrates a representation of a lineage tree 400 for a plurality of partitions for a database, according to some embodiments. The plurality of partitions may correspond to partitions of the database stored at data store 130 of FIG. 1. As an illustrative example, the plurality of partitions may include partitions 402, 412 and 422. In the illustrated example of FIG. 4a, partition 402 is split into two child partitions: partitions 412 and 422. In other embodiments, partitions may be split into two or more child partitions. In some embodiments, each of the plurality of partitions may have corresponding shards for a sequential update stream, as illustrated in FIG. 4b. For example, partition 402 may have a corresponding shard 403, partition 412 may have a corresponding shard 413, and partition 422 may have a corresponding shard 423.

In some embodiments, the shards may comprise one or more data records that may indicate one or more modifications to the database. For example, shard 403 may include data records 404a, 404b, 404c and 404d, shard 413 may include data records 414a ... n, and shard 423 may include data records 424a ... n. The quantity of data records in a given shard can be greater than or less than the illustrated example. In some embodiments, a size of a given shard may be constrained by one or more of a quantity of data records stored in the shard or by time.

A given shard may include metadata to store information regarding the data records in the given shard, according to some embodiments. For example, shard 403 may include metadata 406, shard 413 may include metadata 416, and shard 423 may include metadata 426. In some embodiments, the metadata may include sequence numbers for the operations described by the data records. For example, metadata 406 may include sequence numbers for the operations that are recorded in data records 404a, 404b, 404c and 404d. Metadata 416 may include sequence numbers for the operations that are recorded in data records 414a ... n. Metadata 426 may include sequence numbers for the operations that are recorded in data records 424a ... n. In some embodiments, the metadata may include timestamps for the operations described by the data records. For example, metadata 406 may include timestamps for the operations that are recorded in data records 404a, 404b, 404c and 404d. Metadata 416 may include timestamps for the operations that are recorded in data records 414a ... n. Metadata 426 may include timestamps for the operations that are recorded in data records 424a ... n. In other embodiments, the metadata for the data records may be stored with corresponding data records. For example, metadata for data record 404a may be stored in shard 402 as part of data record 404a in one or more metadata storage containers.

In some embodiments, splitting partition 402 into partition 412 and partition 422 may create separate lineages with respect to partition 412 and partition 422. For example, data record 414a may be mutually exclusive or otherwise unrelated to data record 424a. In some embodiments, sequence numbers for data records 404a-d may serve as a starting point for shards 413 and 423. For example, data record 414a and data record 424a may share a sequence number due to being a next data record on their respective lineages. However, as additional data records are stored to their respective shards, the sequence numbers may diverge.

Partitions 412 and 422 may be created at one or more other storage nodes than a storage node that stores partition 402, according to some embodiments. Additionally, shard 413 and shard 423 may be stored at one or more other storage nodes with respect to shard 403. The different storage nodes may have clock skew with respect to other storage nodes, as described herein. When adjusting timestamps for child shards for child partitions, the child shards may look to timestamps for the parent shard, in some embodiments. In some situations, a child shard may incorrect calculate timestamps when looking at another child shard. For example, a storage node for shard 413 may have a clock skew with respect to a storage node for shard 423. A timestamp for shard 413 may be based on the timestamp of shard 403 to ensure that the lineage from partition 402 to partition 412 is maintained.

As an illustrative example, a lineage for partition 412 may include shard 403 and shard 413 in sequential order. The linage for partition 422 may include shard 403 and shard 423 in sequential order. In some embodiments, shard 413 is created at a different storage node than a storage node that hosts shard 403. In order to maintain a proper lineage between shard 403 and shard 413, a timestamp of shard 413 should be later than or greater than a timestamp for shard 403. The timestamps may be managed as described herein.

Figure 5:
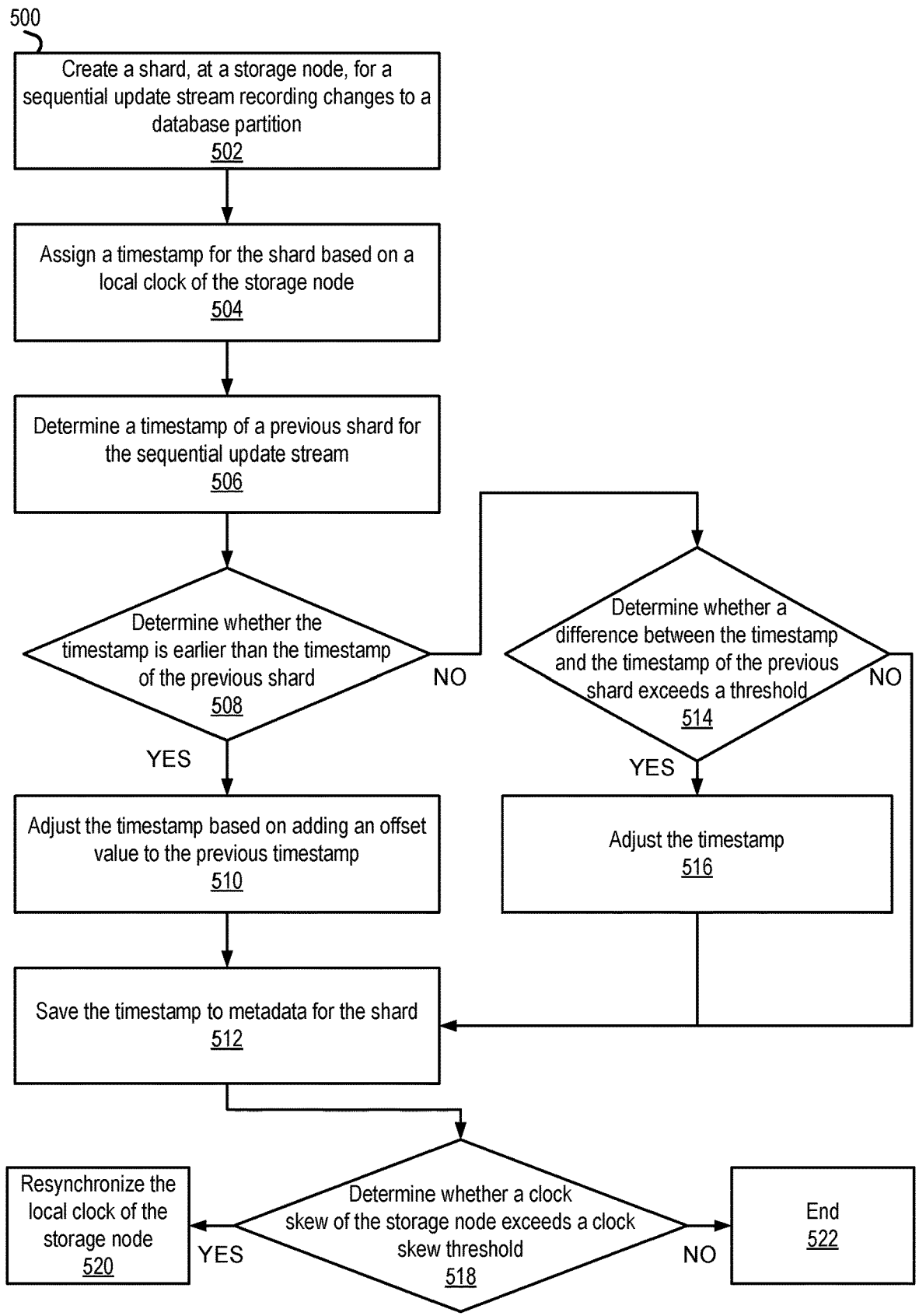
FIG. 5 is a flowchart diagram illustrating a method for setting timestamps in a sequential update stream recording changes to a database partition, according to some embodiments.

FIG. 5 illustrates a method 500 for setting timestamps in a sequential update stream recording changes to a database partition, according to some embodiments. The method 500 may be performed by data stream service 110 of FIG. 1.

Figure 3:
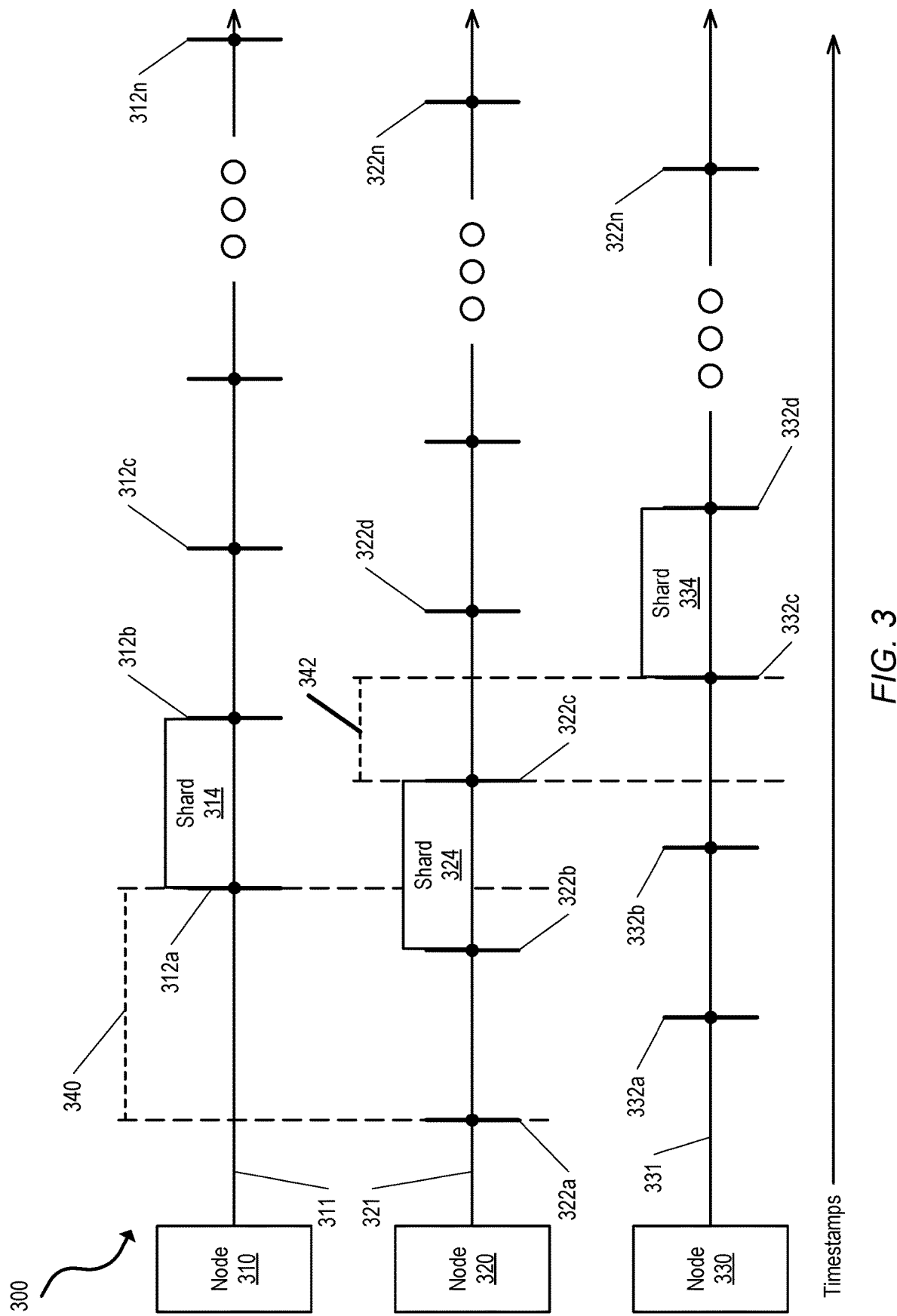
FIG. 3 is a timeline diagram illustrating timestamps for shards of a sequential update stream at a plurality of storage nodes over time, according to some embodiments.

The method 500 includes creating a shard, at a storage node, for a sequential update stream (or a data stream) recording changes to a database partition, at 502. In some embodiments, the shard may correspond to data stream shards 112 of FIG. 1, shards 202, 212 and 222 of FIG. 2, shards 314, 324 and 334 of FIG. 3, or shards 403, 413 and 423 of FIG. 4b. The storage node may correspond to the one or more storage nodes 111 of FIG. 1 or nodes 310, 320 and 330 of FIG. 3. The sequential update stream may correspond to the sequential update stream 200 of FIG. 2.

The method 500 also includes assigning a timestamp for the shard based on a local clock of the storage node, at 504. In some embodiments, the local clock may correspond to the clock 116 of FIG. 1. In some embodiments, assigning the timestamp may include reading a current time from the local clock and generating a numerical representation of the current time.

The method 500 may further include determining a previous timestamp of a previous shard for the sequential update stream, at 506. In some embodiments, the previous shard may correspond to data stream shards 112 of FIG. 1, shards 202, 212 and 222 of FIG. 2, shards 314, 324 and 334 of FIG. 3, or shards 403, 413 and 423 of FIG. 4b. For illustrative purposes, the previous shard may be a shard in the sequential update stream that is created and recorded prior to the creation of the shard at 502. In some embodiments, determining the previous timestamp may include retrieving the previous timestamp from metadata for the previous shard. In some embodiments, the previous shard may be the immediately preceding shard to the newly created shard or the last created shard for the sequential update stream.

The method 500 also includes determining whether the timestamp for the shard is earlier than the timestamp for the previous shard, at 508. In some embodiments, a numerical comparison may be performed to determine whether a numerical value of the timestamp for the shard is greater than or less than the previous timestamp for the previous shard. For example, the numerical values may indicate a point-in-time at which the respective shards were created or completed. In some embodiments, a lower numerical value may indicate that the timestamp is earlier in time relative to the previous timestamp. Determining the relative timing of the timestamps may indicate that the clock for the storage node is experiencing clock skew relative to the clock for the storage node of the previous shard, according to some embodiments.

Based on a determination that the timestamp for the shard is earlier than the previous timestamp for the previous shard, the method continues to 510. Otherwise, based on a determination that the timestamp for the shard is later than the previous timestamp for the previous shard, the method continues to 514.

Based on a determination that the timestamp for the shard is earlier than the previous timestamp for the previous shard, the method 500 further includes adjusting the timestamp based at least in part on adding an offset value to the previous timestamp, at 510. In some embodiments, the previous timestamp may be used as a reference point for subsequent timestamps. For example, based on a determination that the timestamp is earlier than the previous timestamp, lineage of the sequential update stream may be maintained by ensuring that the timestamp will always come after the previous timestamp, notwithstanding any clock skews that may be in effect. The offset value may be a fixed value, in some embodiments. For example, suppose the previous timestamp is 100 and the timestamp is 90. An offset value of 1 may be added to the previous timestamp to calculate a modified timestamp value of 101. In other embodiments, the offset value may be dynamically determined based on the clock skew.

Based on a determination that the timestamp for the shard is later than the previous timestamp for the previous shard, the method 500 further includes determining whether a difference between the timestamp for the shard and the timestamp of the previous shard exceeds a threshold, at 514. In some embodiments, the difference may be referred to as a clock skew, such as clock skew 430 or clock skew 432 of FIG. 4. Based on the determination of 508, the timestamp of the shard is understood to be later than the timestamp of the previous shard. In some embodiments, the difference may be sufficiently large such that the timestamp of the shard appears to be significantly later than the timestamp of the previous shard. For example, the timestamp of the shard may incorrect appear to be days, months or years in the future relative to the timestamp of the previous shard. In some situations, the difference may be intended to be limited to seconds or fractions thereof. In other situations, the difference may be intended to be limited to minutes or hours, depending on the timescale utilized for the sequential update stream. The threshold may be pre-determined by the shard manager or the data stream service. In some situations, a sufficiently large difference between the timestamp for the shard and the timestamp of the previous shard may cause subsequent shards to appear out of the lineage of the sequential update stream.

Based on a determination that the difference between the timestamp for the shard and the timestamp of the previous shard exceeds the threshold, the method continues to 516. Otherwise, based on a determination that the difference between the timestamp for the shard and the timestamp of the previous shard does not exceed the threshold, the method continues to 512 without adjusting the timestamp.

Based on a determination that the difference between the timestamp for the shard and the timestamp of the previous shard exceeds the threshold, the method 500 further includes adjusting the timestamp, at 516. In some embodiments, the timestamp may be limited or capped to a maximum difference between the timestamp for the shard and the timestamp for the previous shard. For example, the timestamp for the shard may be limited to a difference of 1000 time units from the timestamp for the previous shard. In some embodiments, the timestamp may be adjusted based on subtracting a reduction offset value from the timestamp. The reduction offset value may be a predetermined or fixed value. In other embodiments, the reduction offset value may be calculated based on the difference between the timestamp for the shard and the timestamp of the previous shard.

The method 500 further includes by saving the timestamp to metadata for the shard, at 512. In some embodiments, the metadata may correspond to metadata 114 of FIG. 1. In some embodiments, each of the storage nodes may be configured to save the timestamp to respective metadata.

The method 500 also includes determining whether a clock skew of the storage node exceeds a clock skew threshold, at 518. The clock skew may correspond to clock skew 340 or 342 of FIG. 3. In some embodiments, a shard manager may obtain information indicating respective clock skews at one or more storage nodes with respect to one or more other storage nodes. In other embodiments, each storage node may be configured to determine that the respective clock skews satisfy the clock skew threshold. Based on the determination that the clock skew of the storage node satisfies the clock skew threshold (e.g., the clock skew is greater than the clock skew threshold), the method 500 may continue to 516. Based on the determination that the clock skew of the storage node does not satisfy the clock skew threshold, the method 500 may conclude at 522.

The method 500 may conclude by resynchronizing the local clock of the storage node, at 520. In some embodiments, the local clock may be resynchronized to a global clock, such as a clock for the data stream service 110. In other embodiments, the local clock may be resynchronized to another local clock at another storage node, such as the storage node for the previous shard.

Figure 6:
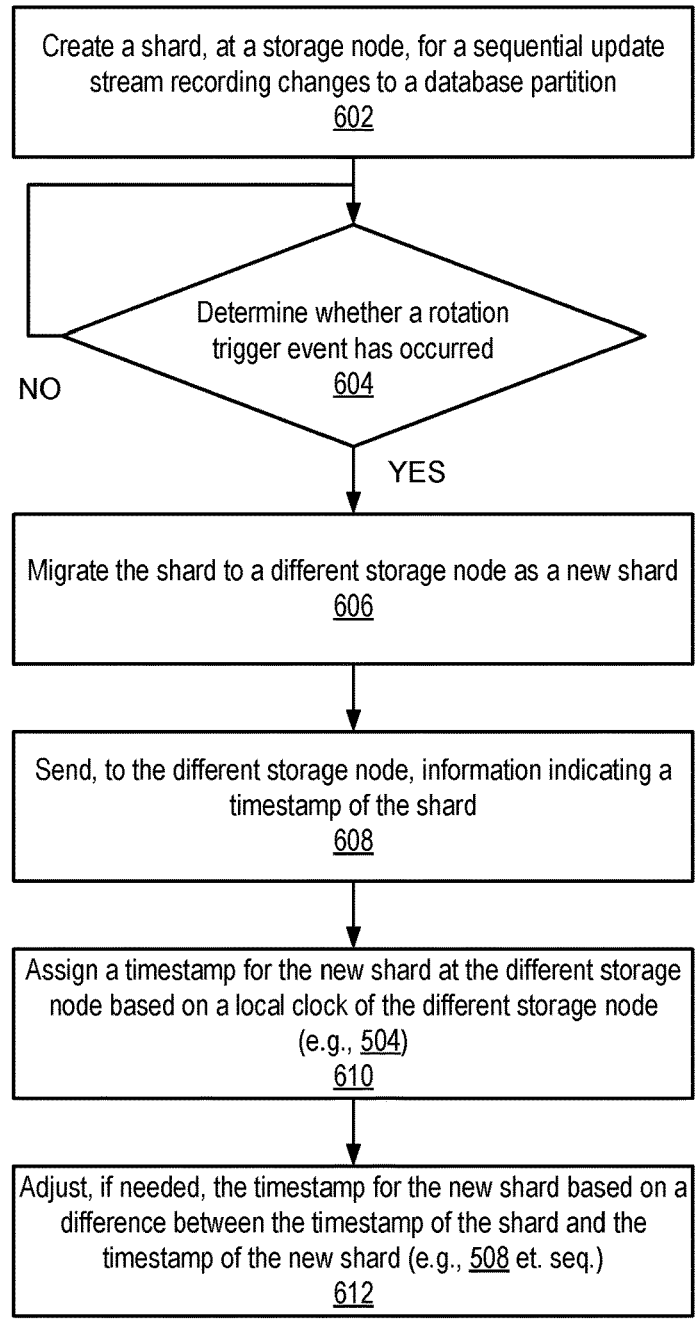
FIG. 6 is a flowchart diagram illustrating a method for creating and migrating shards for a sequential update stream recording changes to a database partition, according to some embodiments.

FIG. 6 illustrates a method 600 for creating and migrating shards for a sequential update stream recording changes to a database partition, according to some embodiments.

The method 600 includes creating, at a storage node, a shard for a sequential update stream recording changes to a database partition, at 602. In some embodiments, the shard may correspond to data stream shards 112 of FIG. 1, shards 202, 212 and 222 of FIG. 2, shards 314, 324 and 334 of FIG. 3, or shards 403, 413 and 423 of FIG. 4*b*. The storage node may correspond to the one or more storage nodes 111 of FIG. 1 or nodes 310, 320 and 330 of FIG. 3. The sequential update stream may correspond to the sequential update stream 200 of FIG. 2.

The method 600 includes determining whether a rotation trigger event has occurred, at 604. In some embodiments, the rotation trigger event may be an event that occurs related to one or more components or computing resources of the data stream service. For example, the rotation trigger event may correspond to a periodic rotation schedule. As another example, the rotation trigger event may correspond to load balancing management across a plurality of storage nodes that maintain the sequential update stream. In some embodiments, the shard may be accessible at the storage node for a pre-determined time period. The shard may be stored at the storage node for the pre-determined time period to alleviate overheating concerns in operating the storage node. In some situations, migrating or rotating the shard to other storage nodes allows heat buildup by the storage nodes to be mitigated or limited to prevent overheating or damage to the storage nodes. Based on the determination that the rotation time period has elapsed, the method 600 continues to 606. Based on the determination that the rotation time period has not elapsed, the method 600 may wait for the rotation trigger event to occur.

The method 600 also includes migrating the shard to a different storage node as a new shard, at 606. In some embodiments, the different storage node may correspond to the one or more storage nodes 111 of FIG. 1 or nodes 310, 320 and 330 of FIG. 3. In some embodiments, migrating the shard may include sending the shard via one or more internal networks that communicatively couple the storage nodes. In some embodiments, the shard may be duplicated at the different storage node such that the shard at the original storage node is not purged or deleted until a retention period has expired. In other embodiments, the shard at the original storage node may be purged or deleted responsive to a confirmation that the shard has been successfully migrated to the different storage node. In yet other embodiments, migrating the shard may include creating the new shard at the different storage node that continues from an end of the shard at the storage node.

The method 600 also includes sending, to the different storage node, information indicating the timestamp of the shard, at 608. In some embodiments, the timestamp of the shard may be sent to the new shard as a reference point for determining a new timestamp for the new shard at a different storage node. For example, the new shard may be assigned a timestamp based on a local clock at the different storage node. Due to a potential clock skew, the assigned time stamp may cause the new shard to appear to be earlier in time relative to the original shard. To alleviate the problem of incorrectly ordered shards in a lineage, the new shard may have its timestamp adjusted based at least in part on the timestamp for the shard, as described herein. For example, the timestamp may be adjusted based on performing the method 500 of FIG. 5. In some embodiments, the information may also include indicating an identifier of the shard and/or a sequence number of a last data record of the shard. The identifier of the shard may be stored as a parent identifier to identify that the new shard has a parent shard in its lineage. In some embodiments, the sequence number of the last data record of the shard may be used as a starting reference point for new shards for child partitions. For example, within a lineage for a child partition, the sequence numbers may maintain a continuous sequence such that traversing the data records may be performed in order without disruption between parent and child shards. In some situations, the child partitions may begin with a similar sequence number but diverge over time as additional, separate data records are written to each of the child shards.

The method 600 also includes assigning a timestamp for the new shard based on a local clock of the different storage node, at 610. In some embodiments, the local clock may correspond to the clock 116 of FIG. 1. In some embodiments, assigning the timestamp may include reading a current time from the local clock and generating a numerical representation of the current time. In some embodiments, assigning the timestamp may also correspond to 504 of FIG. 5.

The method 600 also includes adjusting the timestamp for the new shard based on a difference between the timestamp of the shard and the timestamp of the new shard, at 612. In some embodiments, the difference between the timestamp of the shard and the timestamp of the new shard may be determined based on a numerical comparison to calculate whether the timestamp of the shard or the timestamp of the new shard is earlier. In some embodiments, adjusting the timestamp may correspond to 508 and subsequent steps of FIG. 5.

Figure 7:
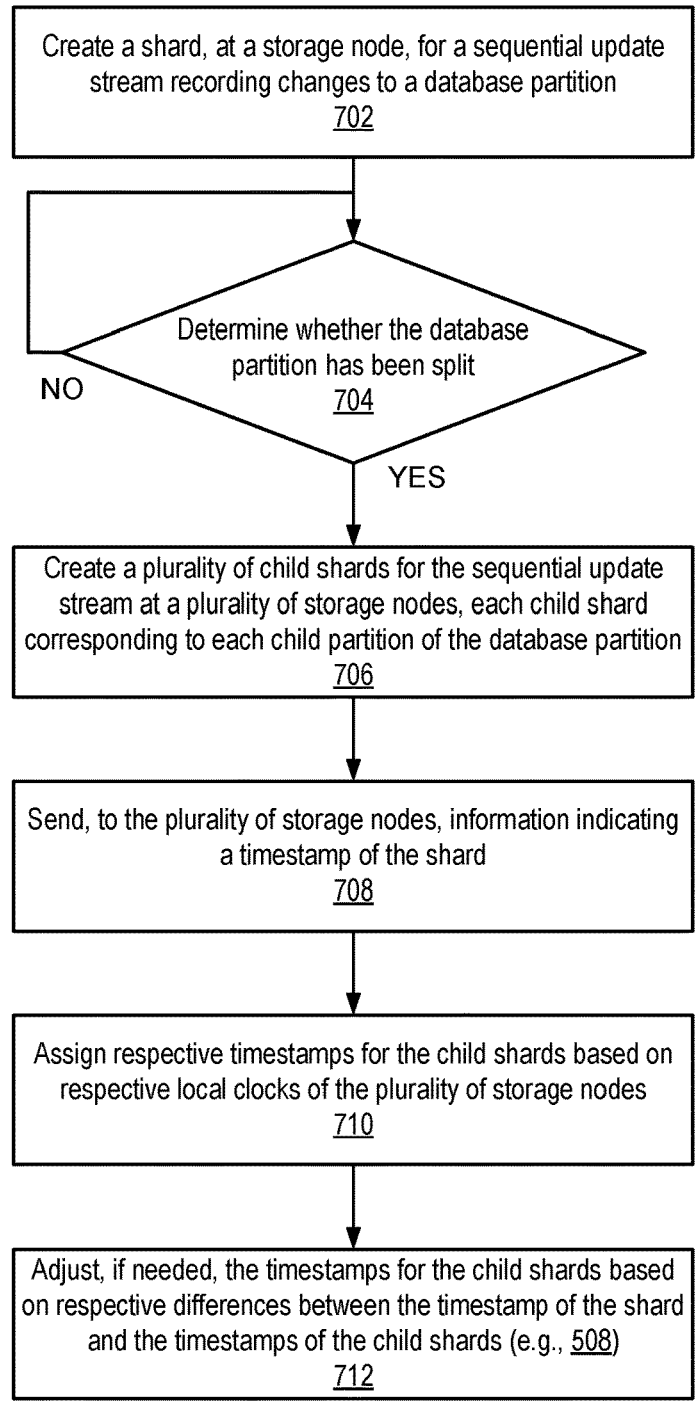
FIG. 7 is a flowchart diagram illustrating a method for creating shards for a sequential update stream recording changes to a database partition responsive to splitting a partition of the database, according to some embodiments.

FIG. 7 illustrates a method 700 for creating shards for a sequential update stream recording changes to a database partition responsive to splitting a partition of the database, according to some embodiments.

The method 700 includes creating, at a storage node, a shard for a sequential update stream recording changes to a database partition, at 702. In some embodiments, the shard may correspond to data stream shards 112 of FIG. 1, shards 202, 212 and 222 of FIG. 2, shards 314, 324 and 334 of FIG. 3, or shards 403, 413 and 423 of FIG. 4*b*. The storage node may correspond to the one or more storage nodes 111 of FIG. 1 or nodes 310, 320 and 330 of FIG. 3. The sequential update stream may correspond to the sequential update stream 200 of FIG. 2.

The method 700 includes determining whether the database partition has been split, at 704. The database partition may be split into a plurality of child partitions. The partition may be associated with the shard, according to some embodiments. For example, the shard may include data records corresponding to modifications to the partition of the database. In some embodiments, the partition may be stored as part of data 132 of FIG. 1. In some embodiments, splitting the partition may be triggered by one or more external factors. For example, the partition may be split responsive to the determination that a subset of data on the partition is modified more frequently than another subset of data on the partition. As another example, the partition may be split responsive to the determination that a cumulative data size of the partition exceeds a size limit. In some embodiments, a shard manager may receive an indication that the partition has been split. The shard manager may correspond to shard manager 118 of FIG. 1. Based on the determination that the partition has been split, the method 700 continues to 708. Based on the determination that the partition has not been split, the method 700 continues back to 704.

The method 700 includes creating a plurality of child shards for the sequential update stream at a plurality of storage nodes, each child shard corresponding to each child partition of the database partition, at 706. In some embodiments, each of the plurality of child shards may correspond to a respective child partition of the split database partition. For example, when the partition is split into two child partitions, two new shards may be created to store data records for each of the child partitions. In some embodiments, the child shards may be stored at separate and different storage nodes.

The method 700 also includes sending, to the plurality of storage nodes, information indicating the timestamp of the shard, at 708. In some embodiments, the timestamp of the shard may be sent to the new shard as a reference point for determining a new timestamp for the new shard at a different storage node. For example, the new shard may be assigned a timestamp based on a local clock at the different storage node. Due to a potential clock skew, the assigned time stamp may cause the new shard to appear to be earlier in time relative to the original shard. To alleviate the problem of incorrectly ordered shards in a lineage, the new shard may have its timestamp adjusted based at least in part on the timestamp for the shard, as described herein. For example, the timestamp may be adjusted based on performing the method 500 of FIG. 5. In some embodiments, the information may also include indicating an identifier of the shard and/or a sequence number of a last data record of the shard. The identifier of the shard may be stored as a parent identifier to identify that the new shard has a parent shard in its lineage. In some embodiments, the sequence number of the last data record of the shard may be used as a starting reference point for new shards for child partitions. For example, within a lineage for a child partition, the sequence numbers may maintain a continuous sequence such that traversing the data records may be performed in order without disruption between parent and child shards. In some situations, the child partitions may begin with a similar sequence number but diverge over time as additional, separate data records are written to each of the child shards.

The method 700 also includes assigning respective timestamps for the child shards based on respective local clocks of the plurality of storage nodes, at 710. In some embodiments, the respective local clocks may correspond to the clock 116 for the storage nodes 111 of FIG. 1. In some embodiments, assigning the timestamp may include reading a current time from the local clock and generating a numerical representation of the current time. In some embodiments, assigning the timestamp may also correspond to 504 of FIG. 5.

The method 700 also includes adjusting the timestamps for the child shards based on respective differences between the timestamp of the shard and the timestamps of the child shards, at 712. In some embodiments, the difference between the timestamp of the shard and the timestamps of the child shards may be determined based on a numerical comparison to calculate whether the individual timestamps of the child shards or the timestamp of the shard is earlier. In some embodiments, adjusting the timestamp may correspond to 508 and subsequent steps of FIG. 5.

Figure 8:
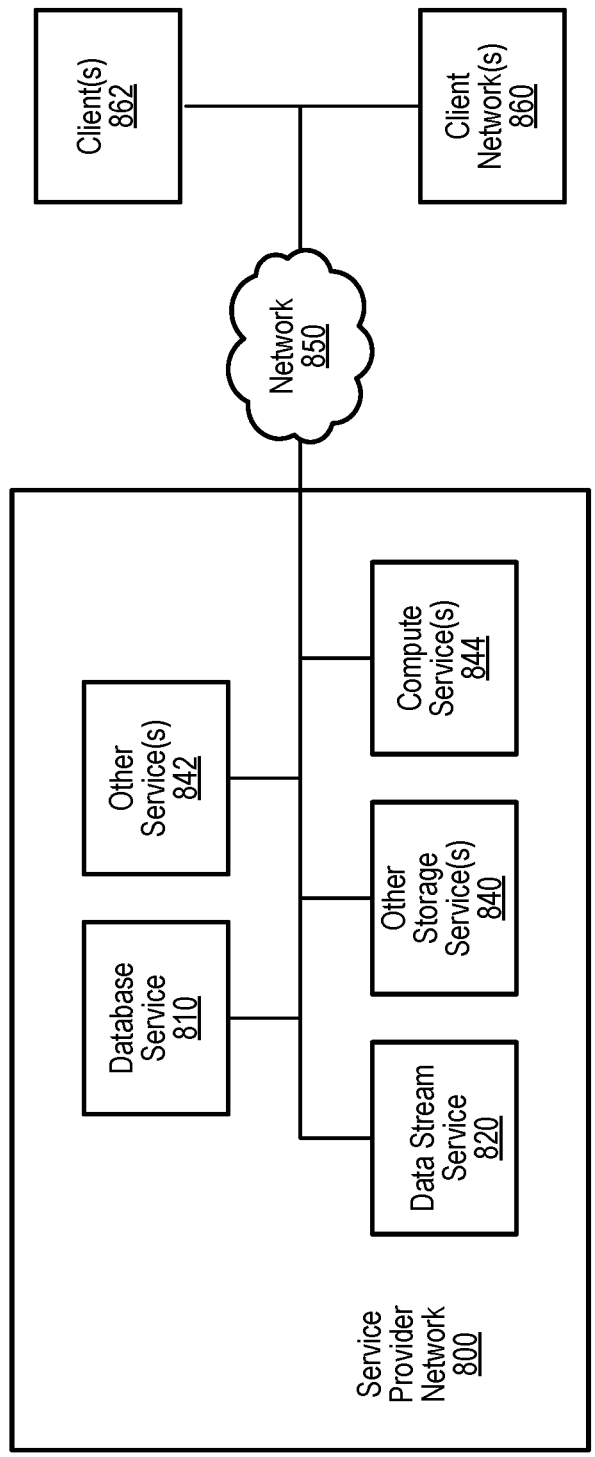
FIG. 8 illustrates a multi-tenant service provider system that provides a sequential update service, according to some embodiments.

FIG. 8 illustrates a multi-tenant service provider system that provides a data stream service, according to some embodiments. Service provider network 800 may be a multi-tenant service provider that provides service over network 850 (e.g., the Internet or a combination of private and public networks) to multiple distinct clients 862 and/or client networks 860, in embodiments. Service provider network 800 is illustrated with database service 810, and data stream service 820 (e.g., data stream service 110, also illustrated in FIG. 1). FIG. 8 illustrates that these components may be part of a service provider network that provides other services 842, other storage services 840 and compute services 844, for example.

Figure 9:
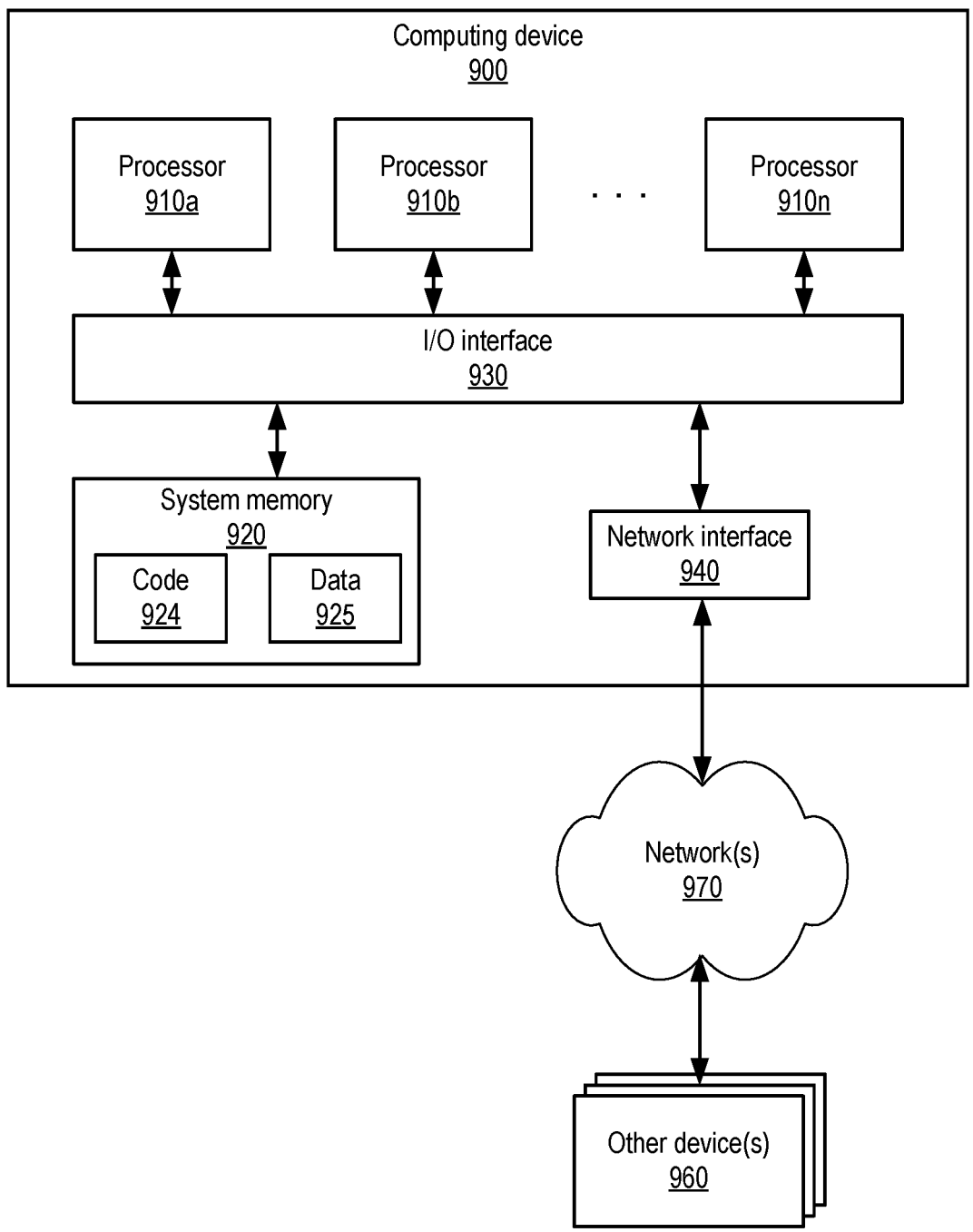
FIG. 9 is a block diagram illustrating an example computer system that may be used in some embodiments.

Any of various computer systems may be configured to implement techniques for tracking a count of a quantity of items in a data store, as disclosed herein. For example, FIG. 9 is a block diagram illustrating one embodiment of a computer system suitable for implementing some or all of the techniques and systems described herein. For example, each of the computer systems may host one or more respective containers. In some cases, a host computer system may host multiple containers. In various embodiments, the provider network may include one or more computer systems 900 such as that illustrated in FIG. 9 or one or more components of the computer system 900 that function in a same or similar way as described for the computer system 900.

In the illustrated embodiment, computer system 900 includes one or more processors 910 coupled to a system memory 920 via an input/output (I/O) interface 930. Computer system 900 further includes a network interface 940 coupled to I/O interface 930. In some embodiments, computer system 900 may be illustrative of servers implementing enterprise logic or downloadable application, while in other embodiments servers may include more, fewer, or different elements than computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be embedded processors implementing any of a variety of instruction set architectures (ISAs), such as the x106, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor 910. In various embodiments, system memory 920 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the tracking of a count of a quantity of items in a data store are shown stored within system memory 920 as program instructions 924. In some embodiments, system memory 920 may include data 925 which may be configured as described herein.

In one embodiment, I/O interface 930 may be configured to coordinate I/O traffic between processor 910, system memory 920 and any peripheral devices in the system, including through network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments, some or all of the functionality of I/O interface 930, such as an interface to system memory 920, may be incorporated directly into processor 910.

Network interface 940 may be configured to allow data to be exchanged between computer system 900 and other devices attached to a network, such as between client devices (e.g., 960, etc.) and other computer systems, or among hosts, for example. In particular, network interface 940 may be configured to allow communication between computer system 900 and/or various other device 960 (e.g., I/O devices). Other devices 960 may include scanning devices, display devices, input devices and/or other communication devices, as described herein. Network interface 940 may commonly support one or more wireless networking protocols (e.g., Wi-Fi/IEEE 802.11, or another wireless networking standard). However, in various embodiments, network interface 940 may support communication via any suitable wired or wireless general data networks 970, such as other types of Ethernet networks, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 900 via I/O interface 930. A computer-readable storage medium may also include any volatile or non-volatile media such as RAM (e.g. SDRAM, DDR SDRAM, RDRAM, SRAM, etc.), ROM, etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, which may be implemented via network interface 940.

In some embodiments, I/O devices may be relatively simple or "thin" client devices. For example, I/O devices may be configured as dumb terminals with display, data entry and communications capabilities, but otherwise little computational functionality. However, in some embodiments, I/O devices may be computer systems configured similarly to computer system 900, including one or more processors 910 and various other devices (though in some embodiments, a computer system 900 implementing an I/O device 950 may have somewhat different devices, or different classes of devices).

In various embodiments, I/O devices (e.g., scanners or display devices and other communication devices) may include, but are not limited to, one or more of: handheld devices, devices worn by or attached to a person, and devices integrated into or mounted on any mobile or fixed equipment, according to various embodiments. I/O devices may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 900. In general, an I/O device (e.g., cursor control device, keyboard, or display(s) may be any device that can communicate with elements of computing system 900.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the data transfer tool, various services, databases, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:
1. A system, comprising:
a plurality of storage nodes of a data stream service of a provider network, each storage node comprising:
one or more processors and memory storing instructions that, when executed by the one or more processors, cause the one or more processors to:

create a shard, at the storage node, for storing records of a sequential update stream recording changes to a database partition;

assign a timestamp for the shard based on a local clock of the storage node;

determine whether the timestamp for the shard is earlier than a timestamp for a previous shard of the sequential update stream stored at a different storage node of the plurality of storage nodes; and based on a determination that the timestamp for the shard is earlier than the timestamp for the previous shard, adjust the timestamp for the shard to a time later than the timestamp for the previous shard of the sequential update stream.

2. The system of claim 1, one or more processors and memory storing instructions that, when executed by the one or more processors, cause the one or more processors to implement a shard manager to:

receive an indication that the database partition has been split into two or more child partitions; and create two or more child shards at two or more other storage nodes of the plurality of storage nodes, wherein the shard at the storage node is a parent shard of the two or more child shards.

3. The system of claim 2, wherein the instructions further cause the one or more processors to:

for each child shard of the two or more child shards:
assign a respective timestamp for the respective new shard based on a local clock of a respective storage node of the one or more other storage nodes; and
adjust the respective timestamp for the respective child shard to a time later than a timestamp for the shard responsive to a determination that the respective timestamp is earlier than the timestamp for the shard.

4. The system of claim 1, wherein to adjust the timestamp for the shard, the instructions further cause the one or more processors to:

compare the timestamp for the shard to the timestamp for the previous shard; and based at least in part on a determination that the timestamp for the shard is earlier than the timestamp for the previous shard, add an offset value to the timestamp of the previous shard to calculate the adjusted timestamp for the shard.

5. The system of claim 1, further comprising one or more processors and memory storing instructions that, when executed by the one or more processors, cause the one or more processors to implement a data stream query service to:

receive, in accordance with an application programming interface (API), a request to retrieve data from the sequential update stream within a specified time period;

generate an ordered list of one or more shards based on respective timestamps within the specified time period; and send, in accordance with the API, the ordered list to a client.

6. A method, comprising:

creating a shard, at a storage node, for storing records of a sequential update stream recording changes to a database partition;

assigning a timestamp for the shard based on a local clock of the storage node;

determining whether the timestamp for the shard is earlier than a timestamp for a previous shard of the sequential update stream stored at a different storage node of the plurality of storage nodes; and based on a determination that the timestamp for the shard is earlier than the timestamp for the previous shard, adjusting the timestamp for the shard to a time later than the timestamp for the previous shard.

7. The method of claim 6, further comprising:

receiving an indication that the database partition has been split into a plurality of child partitions; and creating a plurality of child shards corresponding to the plurality of child partitions at a plurality of other storage nodes.

8. The method of claim 7, further comprising:

for each child shard of the plurality of child shards:
assigning a respective timestamp for the respective child shard based on a local clock of a respective storage node of the plurality of other storage nodes.

9. The method of claim 8, further comprising:

based on a calculation that the respective timestamp for the respective child shard is later than the timestamp for the shard, storing the respective timestamp for the respective child shard to metadata for the respective child shard without adjusting the respective timestamp.

10. The method of claim 8, further comprising:

based on a calculation that the respective timestamp for the respective child shard is earlier than the timestamp for the shard, adjusting the respective timestamp for the respective child shard to a time later than the timestamp for the shard.

11. The method of claim 8, further comprising:

receiving a request to retrieve data from the sequential update stream within a specified time period; and generate a list of one or more of shards based on respective timestamps within the specified time period.

12. The method of claim 6, wherein adjusting the timestamp comprises adding an offset value to the timestamp for the previous shard.

13. The method of claim 6, wherein metadata for the shard includes a parent identifier indicating the previous shard.

14. A non-transitory, computer-readable storage medium storing instructions that, when executed by one or more processors, cause the one or more processors to:

create a shard, at a storage node, for storing records of a sequential update stream recording changes to a database partition;

assign a timestamp for the shard based on a local clock of the storage node;

determine whether the timestamp for the shard is earlier than a timestamp for a previous shard of the sequential update stream stored at a different storage node of the plurality of storage nodes; and based on a determination that the timestamp for the shard is earlier than the timestamp for the previous shard, adjust the timestamp for the shard to a time later than the timestamp for the previous shard.

15. The non-transitory, computer-readable storage medium of claim 14, wherein the instructions further cause the one or more processors to:

receive an indication that the database partition has been split into a plurality of child partitions;

create a plurality of child shards corresponding to the plurality of child partitions at a plurality of other storage nodes;

assign respective timestamps for each of the plurality of child shards based on respective local clocks of the plurality of other storage node; and for each of the plurality of child shards, adjust the respective timestamp for the child shard based on a calculation of whether the timestamp for the child shard is earlier than the timestamp for the shard.

16. The non-transitory, computer-readable storage medium of claim 15, wherein the instructions further cause the one or more processors to:

send, to the plurality of other storage nodes, information indicating the timestamp of the shard.

17. The non-transitory, computer-readable storage medium of claim 14, wherein the instructions further cause the one or more processors to:

determine whether a rotation trigger event has occurred;

responsive to occurrence of the rotation trigger event, create a new shard at another storage node;

assign a timestamp for the new shard based on a local clock of the other storage node; and adjust the timestamp for the new shard based on a calculation of whether the timestamp for the new shard is earlier than the timestamp for the shard.

18. The non-transitory, computer-readable storage medium of claim 17, wherein the instructions further cause the one or more processors to:

responsive to the calculation that the timestamp for the new shard is later than the timestamp for the shard, storing the timestamp to metadata for the new shard without adjusting the timestamp.

19. The non-transitory, computer-readable storage medium of claim 17, wherein the instructions further cause the one or more processors to:

receive a request to retrieve data from the sequential update stream within a specified time period; and generate a list of one or more shards based on respective timestamps within the specified time period.

20. The non-transitory, computer-readable storage medium of claim 14, wherein the instructions further cause the one or more processors to:

receive metadata of the previous shard indicating an identifier for the previous shard, the timestamp for the previous shard, or both.

* * * * *